US012710954B2

(12) United States Patent
He et al.

(10) Patent No.: US 12,710,954 B2
(45) Date of Patent: Aug. 18, 2026

(54) CONTAINER KERNEL UPGRADE METHODS AND APPARATUSES BASED ON PROGRAMMABLE CONTAINER KERNEL

(71) Applicant: Alipay (Hangzhou) Information Technology Co., Ltd., Hangzhou (CN)

(72) Inventors: Yong He, Hangzhou (CN); Jianfeng Tan, Hangzhou (CN); Jiaqi Huang, Hangzhou (CN); Tiwei Bie, Hangzhou (CN); Tianyu Zhou, Hangzhou (CN); Anqi Shen, Hangzhou (CN); Xin Chen, Hangzhou (CN); Yan Yan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 376 days.

(21) Appl. No.: 18/489,655

(22) Filed: Oct. 18, 2023

(65) Prior Publication Data

US 2024/0126536 A1 Apr. 18, 2024

(30) Foreign Application Priority Data

Oct. 18, 2022 (CN) ......................... 202211282345.1

(51) Int. Cl.
*G06F 8/65* (2018.01)

(52) U.S. Cl.
CPC ...................................... *G06F 8/65* (2013.01)

(58) Field of Classification Search
CPC ..................................... G06F 8/61; G06F 8/65
See application file for complete search history.

(56) References Cited

U.S. PATENT DOCUMENTS

2017/0090897 A1* 3/2017 Veereshwara ........... H04L 67/34
2017/0300394 A1* 10/2017 Raut ..................... G06F 11/203
(Continued)

FOREIGN PATENT DOCUMENTS

CN 101697128 A 4/2010
CN 109976886 A 7/2019
(Continued)

OTHER PUBLICATIONS

Arnold et al., "Ksplice: Automatic Rebootless Kernel Updates," In Proceedings of the 4th ACM European conference on Computer systems, Apr. 1, 2009, p. 187-198.
(Continued)

*Primary Examiner* — Duy T Nguyen
(74) *Attorney, Agent, or Firm* — Fish & Richardson P.C.

(57) ABSTRACT

A container kernel upgrade based on a programmable container kernel, includes, in response to receiving a container kernel upgrade request, freezing an application container in which a to-be-upgraded first container kernel is located. Current container status data of an application container including first container kernel status data and application status data is stored. The application container is restarted by using a second container kernel used for upgrading a container kernel, where restarted container status data of the restarted application container includes second container kernel status data corresponding to the second container kernel when the application container is restarted. Using the stored current container status data, a corresponding data field is updated in a data structure of the restarted container status data. A container application is resumed running in the frozen application container in the restarted application container in response to completion of updating the restarted container status data.

17 Claims, 10 Drawing Sheets

(56) References Cited

U.S. PATENT DOCUMENTS

| | | | | |
|---|---|---|---|---|
| 2019/0114164 | A1* | 4/2019 | Wong | G06F 8/658 |
| 2020/0081706 | A1* | 3/2020 | Tal | H04L 63/166 |

FOREIGN PATENT DOCUMENTS

| | | | |
|---|---|---|---|
| CN | 110737501 | A | 1/2020 |
| CN | 114741106 | A | 7/2022 |
| CN | 114780259 | A | 7/2022 |
| KR | 20190085391 | A | 7/2019 |

OTHER PUBLICATIONS

Belair et al., “SNAPPY: programmable kernel-level policies for containers,” SAC ’21: Proceedings of the 36th Annual ACM Symposium on Applied Computing, Mar. 2021, p. 1636-1645.

Chen et al., “Adaptive Android Kernel Live Patching,” In 26th USENIX Security Symposium (USENIX Security 17), 2017, p. 1253-1270.

Choudhury et al., “XDP-Programmable Data Path in the Linux Kernel, ” Spring 2018, 6 pages.

github.com [online], “aliyun/plugsched,” available on or before Mar. 26, 2022, via Internet Archive:Wayback Machine URL <https://web.archive.org/web/20240000000000*/https://github.com/aliyun/plugsched>, retrieved on Feb. 1, 2024, URL <https://github.com/aliyun/plugsched>, 7 pages.

gvisor.dev [online], “TheContainer SecurityPlatform” available on or before Apr. 5, 2019 , via Internet Archive: Wayback Machine URL <https://web.archive.org/web/20240000000000*/https://gvisor.dev/>, retrieved on Feb. 1, 2024, URL <https://gvisor.dev/>, 7 pages.

Hoiland-Jorgensen et al., “The eXpress Data Path: Fast Programmable Packet Processing in the Operating System Kernel,” CoNEXT ’18, Dec. 4-7, 2018, Heraklion, Greece, 13 pages.

Kashyap et al., “Instant OS Updates via Userspace Checkpoint-and-Restart, ” In 2016 USENIX Annual Technical Conference (USENIX ATC 16), 2016, p. 605-619.

ksplice.com [online], “Oracle Ksplice,” available on or before Dec. 8, 2008, via Internet Archive: Wayback Machine URL <https://web.archive.org/web/20240000000000*/https://www.ksplice.com/>, retrieved on Feb. 1, 2024, URL <https://www.ksplice.com/>, 2 pages.

Mvondo et al., “Towards User-Programmable Schedulers in the Operating System Kernel,” In SPMA 22-11th workshop on Systems for Post-Moore Architectures, Apr. 5, 2022, 5 pages.

openeuler.org [online], “openEuler” available on or before Sep. 28, 2023, via Internet Archive: Wayback Machine URL <https://web.archive.org/web/20240000000000*/https://docs.openeuler.org/en/docs/21.03/docs/KernelLiveUpgrade/KernelLiveUpgrade.html>, retrieved on Feb. 1, 2024, URL <https://docs.openeuler.org/en/docs/21.03/docs/KernelLiveUpgrade/KernelLiveUpgrade.html>, 4 pages.

oracle.com [online], “BPF in Depth: The BPF Bytecode and the BPF Verifier” available on or before Sep. 25, 2021, via Internet Archive: Wayback Machine URL <https://web.archive.org/web/20240000000000*/https://blogs.oracle.com/linux/post/bpf-in-depth-the-bpf-bytecode-and-the-bpf-verifier>, retrieved on Feb. 1, 2024, URL <https://blogs.oracle.com/linux/post/bpf-in-depth-the-bpf-bytecode-and-the-bpf-verifier>, 10 pages.

redhat.com [online], “Introducing kpatch: Dynamic Kernel Patching,” Feb. 26, 2014, retrived on Feb. 1, 2024, retrived from URL <https://www.redhat.com/zh/blog/introducing-kpatch-dynamic-kernel-patching>, 4 pages.

ubuntu.com [online], “Livepatch Documentation,” available on or before Sep. 23, 2021, via Internet Archive: Wayback Machine URL <https://web.archive.org/web/20240000000000*/https://ubuntu.com/security/livepatch/docs>, retrieved on Feb. 1, 2024, URL <https://ubuntu.com/security/livepatch/docs>, 3 pages.

Vieira et al., “Fast Packet Processing with eBPF and XDP: Concepts, Code, Challenges, and Applications,” ACM Computing Surveys (CSUR), Feb. 5, 2020, 53(1):1-36.

wikipedia.org [online], “Berkeley Packet Filter,” available on or before Dec. 15, 2005, via Internet Archive: Wayback Machine URL <https://web.archive.org/web/20240000000000*/https://en.wikipedia.org/wiki/Berkeley_Packet_Filter>, retrieved on Feb. 1, 2024, URL <https://en.wikipedia.org/wiki/Berkeley_Packet_Filter>, 5 pages.

wikipedia.org [online], “kpatch,” available on or before Jan. 28, 2015, via Internet Archive: Wayback Machine URL <https://web.archive.org/web/20240000000000*/https://en.wikipedia.org/wiki/Kpatch>, retrieved on Feb. 1, 2024, URL <https://en.wikipedia.org/wiki/Kpatch>, 5 pages.

wikipedia.org [online], “Loadable kernel module,” available on or before Sep. 13, 2006, via Internet Archive: Wayback Machine URL <https://web.archive.org/web/20240000000000*/https://en.wikipedia.org/wiki/Loadable_kernel_module>, retrieved on Feb. 1, 2024, URL <https://en.wikipedia.org/wiki/Loadable_kernel_module>, 5 pages.

* cited by examiner

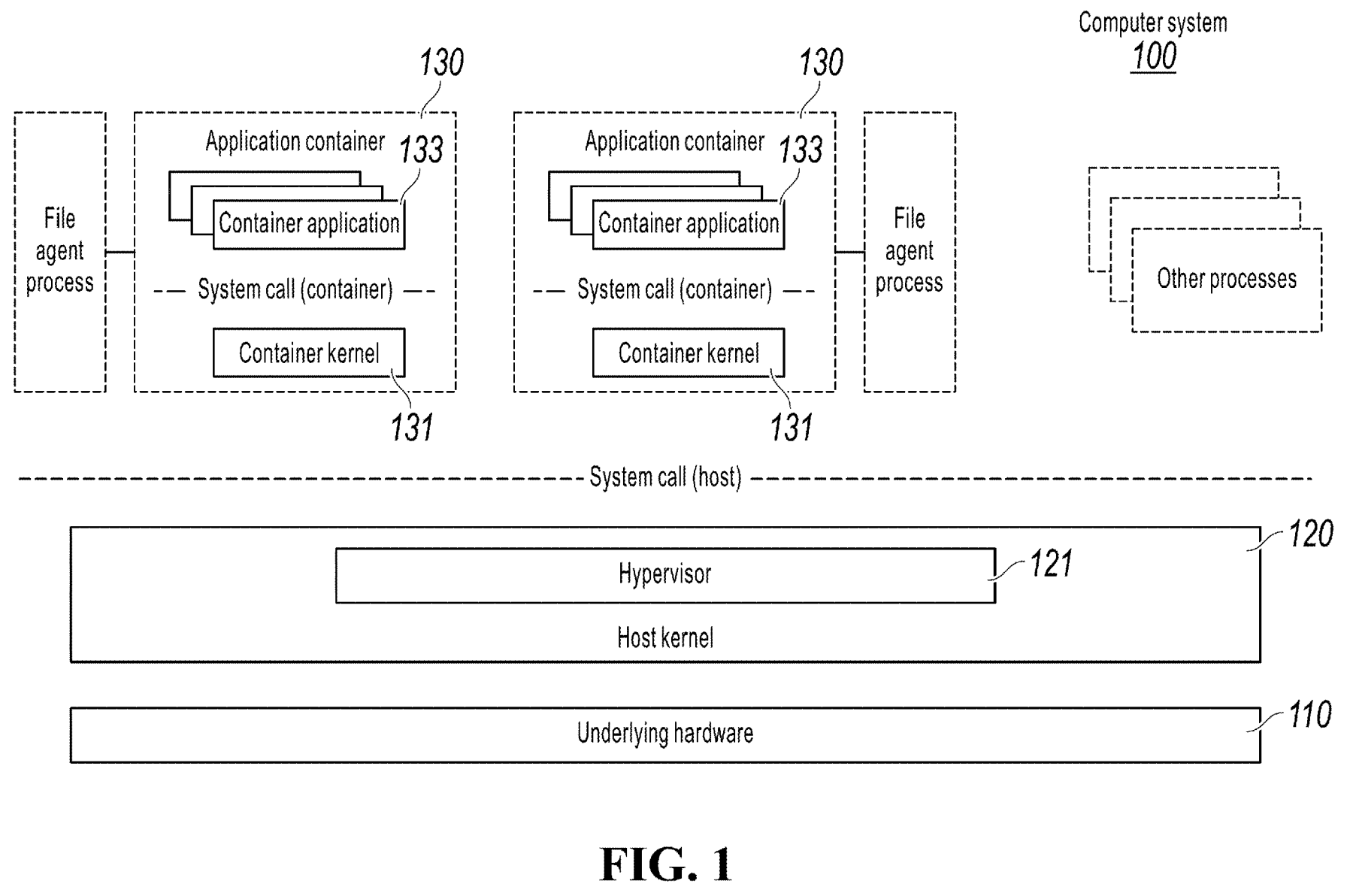

Computer system 100

Other processes

File agent process

130 Application container

133 Container application

System call (container)

131 Container kernel

130 Application container

133 Container application

System call (container)

131 Container kernel

File agent process

System call (host)

120 Host kernel

121 Hypervisor

110 Underlying hardware

FIG. 1

CONTAINER KERNEL UPGRADE METHODS AND APPARATUSES BASED ON PROGRAMMABLE CONTAINER KERNEL

CROSS-REFERENCE TO RELATED APPLICATIONS

This application claims priority to Chinese Patent Application No. 202211282345.1, filed on Oct. 18, 2022, which is hereby incorporated by reference in its entirety.

TECHNICAL FIELD

Some embodiments of this specification generally relate to the operating system field, and in particular, to container kernel upgrade methods and apparatuses based on a programmable container kernel.

BACKGROUND

An application container (also referred to as a secure container) is a runtime technology. In the application container technology, an independent application container kernel is provided for each application. The application container kernel is a lightweight operating system, and can provide an operating system execution environment for a container application in the application container. However, execution of the container application is separated from a host operating system, thereby preventing the container application from directly accessing a host resource, and providing isolation protection between the application container and the host or between the application containers. When the application container kernel provides a system service for the container application, if an operating system vulnerability occurs on and/or a new function is added to the application container kernel, the application container kernel needs to be upgraded.

SUMMARY

In view of the above-mentioned description, some embodiments of this specification provide container kernel upgrade methods and apparatuses based on a programmable container kernel. According to the container kernel upgrade methods and apparatuses, a programmable container kernel can be used to upgrade a container kernel, thereby implementing customized modification of the container kernel during upgrade of the container kernel.

According to an aspect of some embodiments of this specification, a container kernel upgrade method based on a programmable container kernel is provided, including: in response to receiving a container kernel upgrade request, freezing an application container in which a to-be-upgraded first container kernel is located; storing current container status data of the application container, where the current container status data include first container kernel status data corresponding to the first container kernel and application status data of all applications running in the application container, and the current container status data have a first data structure defined by the first container kernel; restarting the application container by using a second container kernel used for upgrading a container kernel, where restarted container status data of the restarted application container include second container kernel status data corresponding to the second container kernel when the application container is restarted, and the restarted container status data have a second data structure defined by the second container kernel; updating corresponding data fields in a data structure of the restarted container status data by using the stored current container status data; and in response to completion of updating the container status data, resuming running of a container application in the frozen application container in the restarted application container.

Optionally, in some examples of the above-mentioned aspect, the storing current container status data of the application container can include: storing the current container status data in a data file in a form of a container snapshot, where the container snapshot is generated by performing data serialization on the current container status data; and the updating the restarted container status data by using the stored current container status data includes: performing data deserialization on the container snapshot in the data file to restore the stored current container status data; and updating the corresponding data fields in the data structure of the restarted container status data by using the restored current container status data.

Optionally, in some examples of the above-mentioned aspect, the current container status data and the restarted container status data are organized into a data tree, and the updating the corresponding data fields in the data structure of the restarted container status data by using the restored current container status data can include: performing the following update process on data nodes one by one from top to bottom starting from a root data node of the data tree of the restarted container status data: determining whether a current data node has a corresponding data node in the data tree of the current container status data; in response to that the data tree of the current container status data does not include the corresponding data node, skipping updating a data field part of the current data node; in response to that the data tree of the current container status data includes the corresponding data node, determining whether a data field of the current data node changes relative to the corresponding data node; in response to that the data field of the current data node does not change relative to the corresponding data node, directly updating data field information of the current data node by using data field information of the corresponding data node; and in response to that the data field of the current data node changes relative to the corresponding data node, updating the data field information of the current data node based on a specified policy by using the data field information of the corresponding data node.

Optionally, in some examples of the above-mentioned aspect, the data file includes a memory file or a disk file.

Optionally, in some examples of the above-mentioned aspect, before the storing current container status data of the application container, the container kernel upgrade method can further include: disabling a packet receiving function of a driver cache of the application container, and submitting a packet in the driver cache to the first container kernel.

Optionally, in some examples of the above-mentioned aspect, before the storing current container status data of the application container, the container kernel upgrade method can further include: discarding all cached data of the application container.

Optionally, in some examples of the above-mentioned aspect, before the storing current container status data of the application container, the container kernel upgrade method can further include: performing abnormality detection on container status data corresponding to each container component in the current container status data of the application container; and/or recording a system startup time and a current real time of the application container.

Optionally, in some examples of the above-mentioned aspect, after the updating the restarted container status data by using the stored current container status data, the container kernel upgrade method can further include: re-opening a host file that is set to open in the current container status data.

Optionally, in some examples of the above-mentioned aspect, after the updating the restarted container status data by using the stored current container status data, the container kernel upgrade method can further include: determining a system startup time of the application container; and/or enabling a hardware transceiver function of the application container.

According to another aspect of some embodiments of this specification, a container kernel upgrade apparatus based on a programmable container kernel is provided, including: a container freezing unit, configured to: in response to receiving a container kernel upgrade request, freeze an application container in which a to-be-upgraded first container kernel is located; a container status data storage unit, configured to store current container status data of the application container, where the current container status data include first container kernel status data corresponding to the first container kernel and application status data of all applications running in the application container, and the current container status data have a first data structure specified by the first container kernel; a container restart unit, configured to restart the application container by using a second container kernel used for upgrading a container kernel, where restarted container status data of the restarted application container include second container kernel status data corresponding to the second container kernel when the application container is restarted, and the restarted container status data have a second data structure specified by the second container kernel; a container status data updating unit, configured to update corresponding data fields in a data structure of the restarted container status data by using the stored current container status data; and an application running resuming unit, configured to: in response to completion of updating the container status data, resume running of a container application in the frozen application container in the restarted application container.

Optionally, in some examples of the above-mentioned aspect, the container status data storage unit is configured to store the current container status data in a data file in a form of a container snapshot, where the container snapshot is generated by performing data serialization on the current container status data; and the container status data updating unit can include: a container status data restoration module, configured to perform data deserialization on the container snapshot in the data file to restore the current container status data; and a container status data updating module, configured to update the corresponding data fields in the data structure of the restarted container status data by using the current container status data.

Optionally, in some examples of the above-mentioned aspect, the current container status data and the restarted container status data are organized into a data tree, and the container status data updating module is configured to: perform the following update process on data nodes one by one from top to bottom starting from a root data node of the data tree of the restarted container status data: determining whether a current data node has a corresponding data node in the data tree of the current container status data; in response to that the data tree of the current container status data does not include the corresponding data node, skipping updating a data field part of the current data node; in response to that the data tree of the current container status data includes the corresponding data node, determining whether a data field of the current data node changes relative to the corresponding data node; in response to that the data field of the current data node does not change relative to the corresponding data node, directly updating data field information of the current data node by using data field information of the corresponding data node; and in response to that the data field of the current data node changes relative to the corresponding data node, updating the data field information of the current data node based on a specified policy by using the data field information of the corresponding data node.

Optionally, in some examples of the above-mentioned aspect, the container kernel upgrade apparatus can further include: a global preprocessing unit, configured to: before the storing current container status data of the application container, disable a packet receiving function of a driver cache of the application container, and submit a packet in the driver cache to the first container kernel.

Optionally, in some examples of the above-mentioned aspect, the container kernel upgrade apparatus can further include a post-processing unit, configured to: after the updating the restarted container status data by using the stored current container status data, re-open a host file that is set to open in the current container status data.

According to another aspect of some embodiments of this specification, a container kernel upgrade apparatus based on a programmable container kernel is provided, including: at least one processor; a memory coupled to the at least one processor; and a computer program stored in the memory, where the at least one processor executes the computer program to implement the above-mentioned container kernel upgrade method based on a programmable container kernel.

According to another aspect of some embodiments of this specification, a computer-readable storage medium is provided, where the computer-readable storage medium stores an executable instruction, and when being executed, the instruction enables a processor to perform the above-mentioned container kernel upgrade method based on a programmable container kernel.

According to another aspect of some embodiments of this specification, a computer program product is provided, including a computer program, where the computer program is executed by a processor to implement the above-mentioned container kernel upgrade method based on a programmable container kernel.

BRIEF DESCRIPTION OF DRAWINGS

The essence and advantages of this specification can be further understood with reference to the following accompanying drawings. In the accompanying drawings, similar components or features can have the same reference numerals.

FIG. 1 is an example schematic diagram illustrating a computer system architecture, according to some embodiments of this specification;

DESCRIPTION OF EMBODIMENTS

Figure 2:
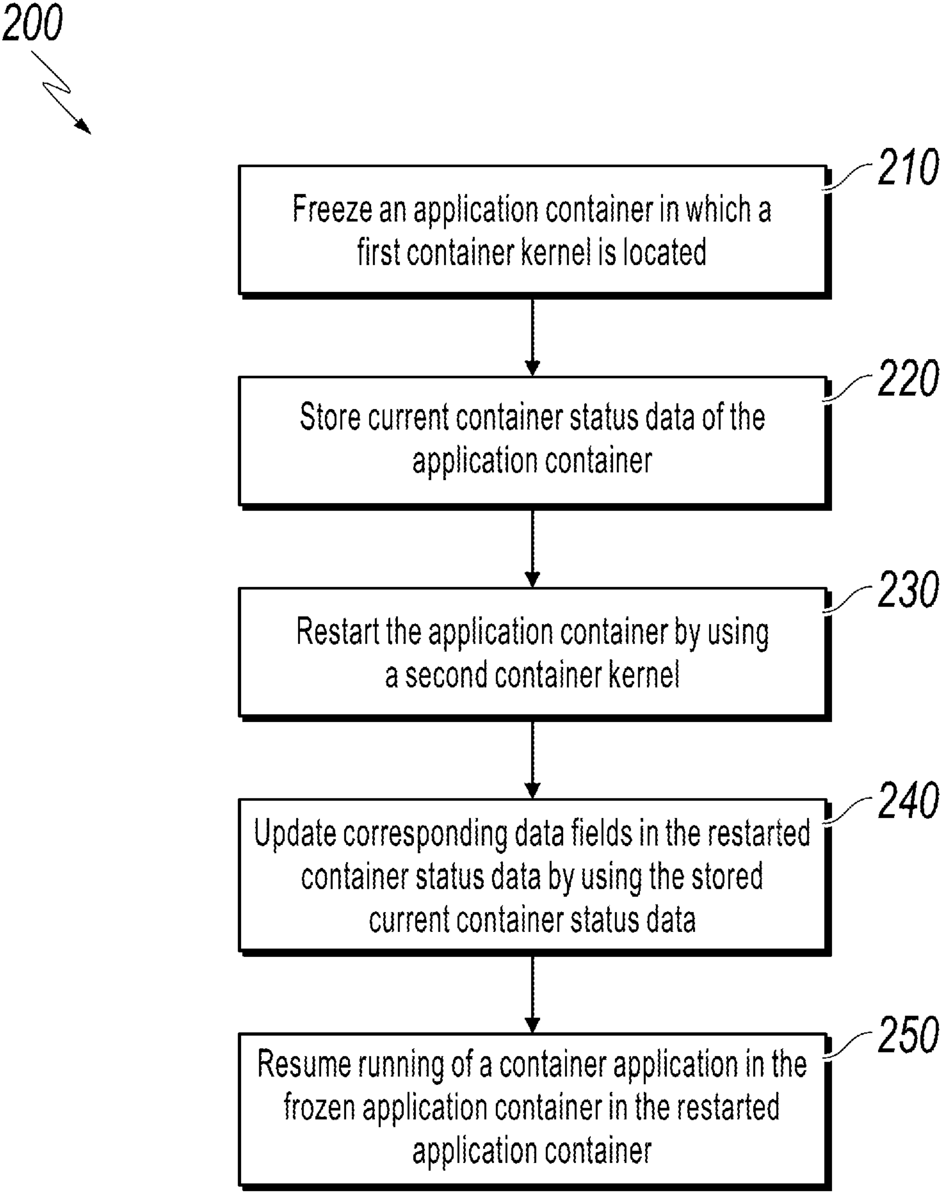
FIG. 2 is an example flowchart illustrating a container kernel upgrade method based on a programmable container kernel, according to some embodiments of this specification.

The subject matters described in this specification are discussed below with reference to some example implementations. It should be understood that the discussion of these implementations is merely intended to enable a person skilled in the art to better understand the subject matters described in this specification, and is not intended to limit the protection scope, applicability, or examples described in the claims. The functions and arrangements of the elements under discussion can be changed without departing from the protection scope of this specification. Various processes or components can be omitted, replaced, or added in various examples as needed. For example, the described method can be performed in a sequence different from the described sequence, and the steps can be added, omitted, or combined. In addition, the features described in some examples can also be combined in other examples.

As used in this specification, the term “include” and variants thereof represent an open term, which means “including but not limited to”. The term “based on” represents “at least partially based on”. The term “some embodiments” represents “at least one embodiment”. The term “some other embodiments” represents “at least one other embodiment”. The terms “first”, “second”, etc. can refer to different or identical objects. Other definitions, whether explicit or implicit, can be included below. Unless expressly specified in the context, the definition of a term is consistent throughout the specification.

To upgrade an application container kernel, an implementation solution is to install a new version of the application container kernel (i.e., an operating system) and then restart the application container kernel to switch to the new version of the application container kernel system for running. In such an implementation solution, a container application that is running in an application container needs to be disabled or migrated, an application container kernel (including an initialization hardware resource) needs to be reloaded, and then the container application is restarted. Consequently, running of the container application is interrupted for a long time, especially in an application scenario in which startup of application container initialization is time-consuming.

To alleviate the above-mentioned problem, an application container kernel that supports the Checkpoint/Restore In Userspace (CRIU) technology is proposed. The application container kernel can use the CRIU to support cross-version container kernel upgrade. In the CRIU, a group of applications (in a unit of an application container) can be suspended, all status data of the group of applications can be stored in a disk file, and then a running status of the group of applications can be resumed from the disk file when needed such that the group of applications continues to run, thereby satisfying needs such as application container migration and program status snapshot.

However, in the CRIU, storage/restoration of the status data totally relies on an API/System Call of the application container kernel. Therefore, only the container application running in the application container can be restored, and a program running kernel cannot be affected. Consequently, restoration and upgrade of a customized application container kernel cannot be implemented. In this specification, the term “customized application container kernel” is also referred to as “programmable application container kernel”. The programmable container kernel refers to customized update of a function and a data structure that are supported by the application container kernel through programming.

In view of the above-mentioned description, some embodiments of this specification provide a container kernel upgrade method based on a programmable container kernel. In the container kernel upgrade solution, current container status data of a to-be-upgraded first container kernel are stored, where the stored current container status data include first container kernel status data corresponding to the first container kernel and application status data of all applications running in the application container, and the stored current container status data are organized to have a first data structure defined by a container kernel version of the first container kernel. After the application container is restarted by using the second container kernel obtained by programming code logic of the container kernel, the restarted container status data of the restarted application container can have a second data structure defined by a container kernel version of a second container kernel. Then, the stored current container status data are used to update corresponding data fields in the second data structure of the restarted container status data, and in response to completion of updating the container status data, the frozen container application is run again in the restarted application container, thereby completing customized restoration and upgrade of the application container kernel.

The container kernel upgrade methods and apparatuses based on a programmable container kernel according to some embodiments of this specification are described below with reference to the accompanying drawings.

FIG. 1 is an example schematic diagram illustrating a computer system architecture 100, according to some embodiments of this specification.

As shown in FIG. 1, the computer system 100 includes underlying hardware 110, a host kernel 120, and an application container 130.

The underlying hardware 110 provides a hardware environment needed for running an application. For example, the underlying hardware 110 can include a processor, a storage device, etc. In some embodiments, for example, examples of the processor can include but are not limited to one or a combination of a central processing unit (CPU), an application-specific integrated circuit (ASIC), an application-specific instruction set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction set computer (RISC), a microprocessor, etc. In some embodiments, for example, the storage device can include but is not limited to a large-capacity memory, a removable memory, a volatile read-write memory, a read-only memory (ROM), etc., or any combination thereof. Example large-capacity memories can include a magnetic disk, an optical disc, a solid state disk, etc. Example removable memories can include a flash drive, a floppy disk, an optical disc, a storage card, a compact disc, a magnetic tape, etc. Example volatile read-only memories can include a random access memory (RAM). Example RAMs can include a dynamic RAM (DRAM), a double data rate synchronous dynamic RAM (DDRSDRAM), a static RAM (SRAM), a thyristor RAM (T-RAM), a zero capacitor RAM (Z-RAM), etc. Example ROMs can include a mask ROM (MROM), a programmable ROM (PROM), an erasable programmable ROM (PEROM), an electrically erasable programmable ROM (EEPROM), a compact disc ROM (CD-ROM), a digital versatile disc ROM, etc. In some embodiments, the storage device 140 can be implemented on a cloud platform. By way of example only, the cloud platform can include a private cloud, a public cloud, a hybrid cloud, a community cloud, a distributed cloud, an internal cloud, a multi-tier cloud, etc., or any combination thereof.

The host kernel 120 is an operating system kernel running on the underlying hardware 110. The host kernel 120 is a first-layer software extension based on the underlying hardware 110, and is responsible for managing a process, a memory, a device driver, a file, and a network system of a computer system, and determines performance and stability of the computer system. For example, examples of the host kernel 120 can include but are not limited to a Windows kernel, a Linux kernel, etc.

The application container 130 runs above the host kernel 120. Each application container 130 has an independent container kernel 131. The container kernel 131 can provide an isolated operating system execution environment for one or more container applications 133 running in the application container 130, so as to isolate execution of the container application 133 from the host kernel 120, thereby preventing the container application from directly accessing a host resource, and providing isolation protection between the application container 130 and the host kernel 120 or another application container 130. In some embodiments, for example, examples of the container kernel 131 can include but are not limited to an operating system kernel such as a Windows kernel and a Linux kernel. More preferably, the container kernel 131 can include an operating system kernel that supports implementation of kernel status storage/restoration through serialization/deserialization.

The host kernel 120 has a management program (hypervisor) 121. Working modes of a processor in a hardware structure include a root mode and a non-root mode. The non-root mode is used to run a virtual machine, and is configured, created, and entered by using the root mode. The application container 130 is considered as a process (container process) by the host kernel 120. The container process can enter the non-root mode through the hypervisor. In the non-root mode, the container kernel 133 provides an OS function, and then provides a standard application running environment compatible with the host operating system (e.g., Linux system) such that the container application in the application container runs in an OS environment similar to the host operating system. In addition, the computer system 100 can further include another process that can be run by the host kernel 120, such as a file agent process. For example, the another process can run in the root mode or run in the non-root mode.

FIG. 2 is an example flowchart illustrating a container kernel upgrade method 200 based on a programmable container kernel, according to some embodiments of this specification.

As shown in FIG. 2, at 210, an application container in which a to-be-upgraded first container kernel is located is frozen in response to receiving a container kernel upgrade request. After the application container is frozen, a running environment of the application container stops running, for example, process running, packet sending and receiving, and file read/write in the application container are terminated. In addition, the container application in the frozen application container no longer runs, and no longer occupies a related resource of an OS provided by the container kernel.

At 220, current container status data (referred to as first container status data below) of an application container are stored, where the stored first container status data include container kernel status data corresponding to a first container kernel and all application status data of all applications running in the application container, and the first container status data have a first data structure defined by a container kernel version (for example, code logic) of the first container kernel. The container kernel mentioned in some embodiments of this specification is a programmable container kernel. During programming, each container kernel can be compiled to have a data structure defined by the current container kernel version such that the container status data stored in the container kernel are organized based on the defined data structure. For example, when an application runs in an application container in which a container kernel is located, the container kernel stores a process management data structure, a memory management data structure, a file management data structure, and data of the application (for example, a memory of the application and code of the application) for each application. In addition, the container kernel further stores some global data structures shared by a plurality of applications, such as a control group and a shared memory. The above-mentioned data stored in the container kernel are referred to as container status data, and the stored container status data are organized as a data structure defined by a corresponding container kernel version.

For example, the container status data of the application container can include but are not limited to global configuration information, kernel status information, a file system, memory management, a namespace, a shared memory, a control group (cgroup), network connection information, a cache packet process status (context), process memory, etc.

Figure 3:
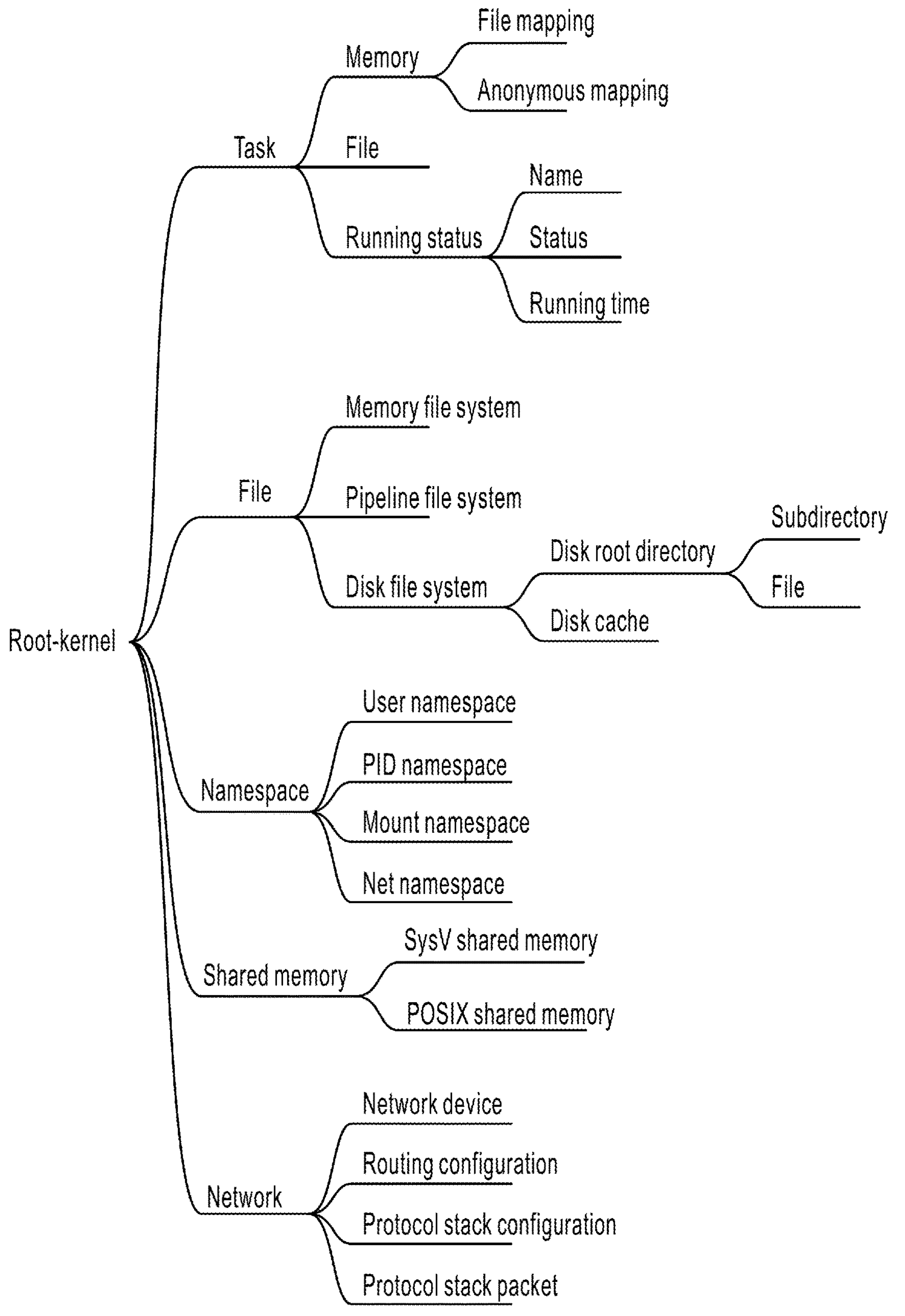
FIG. 3 is an example schematic diagram illustrating a data structure of container status data, according to some embodiments of this specification.

FIG. 3 is an example schematic diagram illustrating a data structure of container status data, according to some embodiments of this specification.

As shown in FIG. 3, all container status data of the application container are organized into one tree. A root data node (also referred to as a root data member) of the tree is a container kernel (root-kernel), and level-1 descendant data nodes include a task, a file system, a namespace, a shared memory, a network, etc. A level-2 descendant data node is a further division (a descendant data node) of each level-1 data node. For example, level-2 data nodes for the task include a memory, a file, a running status, etc. Level-2 data nodes for the file system include a memory file system, a pipeline file system, a disk file system, etc. Level-2 data nodes for the namespace include User namespace, PID namespace, Mount namespace, Net namespace, etc. Level-2 data nodes for the shared memory include Unix System V shared memory, Portable Operating System Interface (POSIX) shared memory, etc. Level-2 data nodes for the network include a network device, a routing configuration, a protocol stack configuration, a protocol stack packet, etc. In addition, each level-2 data node also has corresponding descendant data nodes. Mutual references exist between branches of the data tree, for example, the process opens a file.

In some embodiments, during status storage for the data tree of the first container status data, a container snapshot is generated by performing data serialization on the first container status data. Then, the generated container snapshot is written into a data file. As such, the first container status data are stored in the data file in a form of a container snapshot. In some embodiments, the container snapshot can be written into a disk file. In some embodiments, the container snapshot can be written into a memory file. Since a write/read speed of the memory file is far higher than that of the disk file, a read/write time of the container snapshot can be shortened, and an upgrade time of the container kernel can be shortened. A data serialization process for the container status data can be implemented by using any appropriate data serialization solution in the art.

Referring back to FIG. 2, at 230, a frozen application container is restarted by using a second container kernel used for upgrading a container kernel. It is worthwhile to note that the "application container restart" described here includes only restarting a running environment of the application container, and does not resume running of any frozen application in the application container. For example, the second container kernel can be obtained by updating a version of the container kernel through programming, thereby adding a new kernel function (for example, adding a new system) or implementing another modification for the container kernel. In an updated container kernel version of the second container kernel, a data structure (namely, a data structure used when the container status data are stored) corresponding to the container kernel is redefined, for example, a data node in the data structure is modified, a data type and/or a data field value of the data node is modified, and so on. As such, the data structure of the container status data is changed from the first data structure to the second data structure, or a new second data structure is redefined. In this specification, both the "first container kernel" and the "second container kernel" are programmable container kernels. The second container kernel can read and modify the first container status data such that the first container status data can be used in the second container kernel, thereby achieving a programming effect of the container kernel running logic. For example, through comparison between a data structure type in the first container status data and a data structure type in the second container status data, a member addition/deletion status of a corresponding data structure type in the second container status data is identified, and corresponding data fields in the second container status data are automatically restored to data field values stored in the first container status data. After the frozen application container is restarted by using the second container kernel, the restarted application container resumes the running environment. Since none of the applications in the application container is started after the application container is restarted, the restarted container status data obtained after the application container is restarted include no application status data, and the restarted container status data have a second data structure that is different from the first data structure defined by the container kernel version of the to-be-upgraded container kernel. For example, data nodes in the data trees of the first container status data and the second container status data are different, data fields limited by the data structure type of the data node are different, and/or data field values are different.

At 240, corresponding data fields in a data structure of the restarted container status data (referred to as second container status data below) of the restarted application container are updated by using the stored first container status data.

In some embodiments, data deserialization is performed on the container snapshot in the data file to restore the stored first container status data. Then, corresponding data fields in the data structure (the second data structure) of the second container status data are updated by using the restored first container status data.

Figure 4:
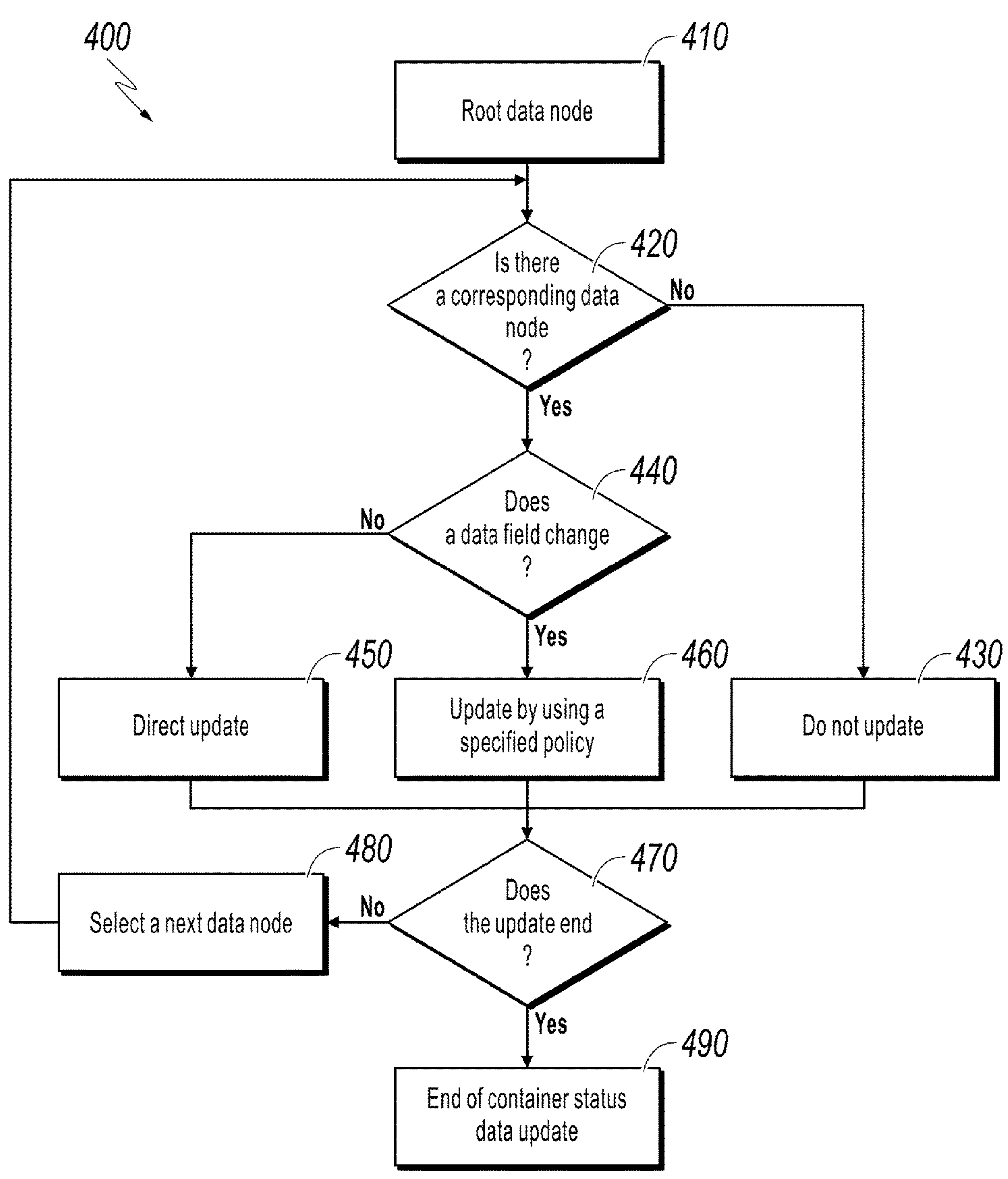
FIG. 4 is an example flowchart illustrating a container status data update process, according to some embodiments of this specification.

FIG. 4 is an example flowchart illustrating a container status data update process 400, according to some embodiments of this specification. In the example of FIG. 4, the first container status data and the second container status data are organized into a data tree.

In the example process of FIG. 4, the following update process is iteratively performed on data nodes one by one from top to bottom starting from a root data node of the data tree of the second container status data.

In each iterative update process, at 420, it is determined whether a current data node in the data tree of the second container status data has a corresponding data node in the data tree of the first container status data.

In response to that the data tree of the first container status data does not include the corresponding data node, at 430, the data field of the current data node is not updated, and then 470 is performed.

In response to that the data tree of the first container status data includes the corresponding data node, at 440, it is determined whether a data field of the current data node changes relative to the corresponding data node. For example, the first container status data and the second container status data store data structure types of the data node, and the data structure types of the data node can be compared to identify whether a new data field is added to the data node or an old data field is deleted from the data node. In response to that the data field of the current data node does not change relative to the corresponding data node, at 450, data field information of the current data node is directly updated by using data field information of the corresponding data node in the data tree of the first container status data, and then 470 is performed.

In response to that the data field of the current data node changes relative to the corresponding data node, at 460, the data field information of the current data node is updated based on a specified policy by using the data field information of the corresponding data node in the data tree of the first container status data. For example, it is assumed that the data field information of the data node is modified (a data field is newly added or deleted), for example, names are the same but types are different. In such case, customized restoration can be supported. For example, first, the data field information of the corresponding data node in the data tree of the first container status data is restored to temporary variables. Then, the data field information of the current data node in the data tree of the second container status data is reconstructed based on the temporary variables. Then, proceed to 470.

At 470, it is determined whether the update of the data node in the data tree of the second container status data ends, that is, whether the above-mentioned update process is completed for all the data nodes. If there is a data node that is not updated, at 480, a next data node is selected from the data tree of the second container status data. For example, the next data node can be determined by using a traversal method. Then, the processing procedure of 420 to 470 is repeatedly performed for the selected next data node. If there is no data node that is not updated, at 490, the container status data update ends.

Referring back to FIG. 2, in response to completion of updating the container status data, at 250, a container application in the frozen application container is run again in the restarted application container, thereby implementing the process of upgrading a programmable container kernel.

According to the above-mentioned container kernel upgrade solution based on a programmable container kernel, the current container status data of the to-be-upgraded first container kernel are stored, where the stored current container status data have the first data structure defined by the container kernel version of the first container kernel, and the stored current container status data include the first container kernel status data corresponding to the first container kernel and the application status data of all applications running in the application container. In addition, after the application container is restarted by using the second container kernel that is obtained by programming the code version (for example, the code logic) of the container kernel, the stored current container status data are used to update the corresponding data fields in the second data structure of the restarted container status data such that the upgraded second container kernel can restore status information of the container application running in the first container kernel before the upgrade and have a new characteristic of the programmed second container kernel, thereby completing customized restoration and upgrade of the container kernel.

In addition, according to the above-mentioned container kernel upgrade solution, container kernel logic can be rapidly upgraded, and a container application running in a previous container kernel can be quickly restored. In the above-mentioned container kernel upgrade process, processes of stopping, migrating, and starting the container application are not needed such that the container kernel upgrade can be implemented nearly without interruption (or with interruption in seconds) of the container application.

Figure 5:
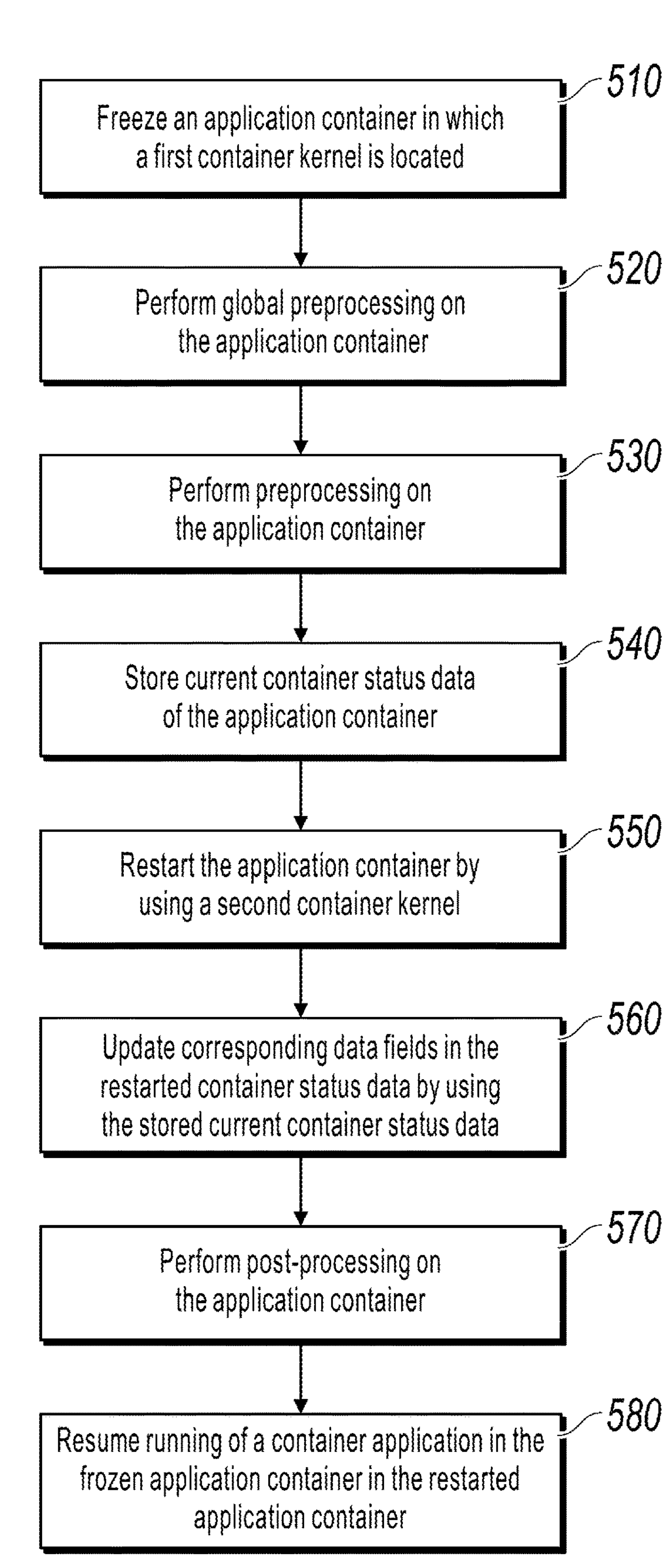
FIG. 5 is an example flowchart illustrating a container kernel upgrade method based on a programmable container kernel, according to some other embodiments of this specification.

FIG. 5 is an example flowchart illustrating a container kernel upgrade method 500 based on a programmable container kernel, according to some embodiments of this specification. The embodiment shown in FIG. 5 is a modified embodiment for the embodiment shown in FIG. 2.

As shown in FIG. 5, at 510, an application container in which a to-be-upgraded first container kernel is located is frozen in response to receiving a container kernel upgrade request.

At 520, global preprocessing is performed on the application container.

In some embodiments, when global preprocessing is performed, a packet receiving function of a driver cache of the application container is disabled, and a packet in the driver cache is submitted to the first container kernel. After receiving the submitted packet, the first container kernel can cache the received packet through status storage so as to maintain consistency of software and hardware statuses and ensure that no unprocessed data exist in hardware, thereby avoiding a data loss caused by caching data in the hardware during programming/upgrade of the container kernel.

In some embodiments, when global preprocessing is performed, all cached data of the application container can be further discarded, for example, the cached data in the file cache are discarded to accelerate the process of status storage for the container kernel data.

At 530, preprocessing is performed on the application container. It is worthwhile to note that the preprocessing is performed for each individual component of the application container. For example, file data structures of the container kernel are uniformly processed based on preprocessing logic of the file data structures. Memory data, process data, and the like are processed in a similar way.

In some embodiments, when preprocessing is performed, abnormality detection can be performed on container status data corresponding to each container component in the current container status data of the application container. Once a data abnormality is detected, the container kernel upgrade process is terminated.

In some embodiments, when preprocessing is performed, a system startup time and a current real time of the application container can be further recorded. For example, the system startup time m0 and the current real time r0 of the application container are recorded. As such, during data restoration, a time offset of the system startup time can be calculated based on a difference between a new real time r1 and the recorded real time r0, i.e., offset=r1−r0. Therefore, the restored system startup time is a continuous time.

At 540, current container status data of an application container are stored, where the stored current container status data include container kernel status data corresponding to a first container kernel and all application status data of all applications running in the application container, and the current container status data have a first data structure defined by a container kernel version of the first container kernel. For a process of storing the container status data, references can be made to the above-mentioned description of 220 in FIG. 2.

Figure 6:
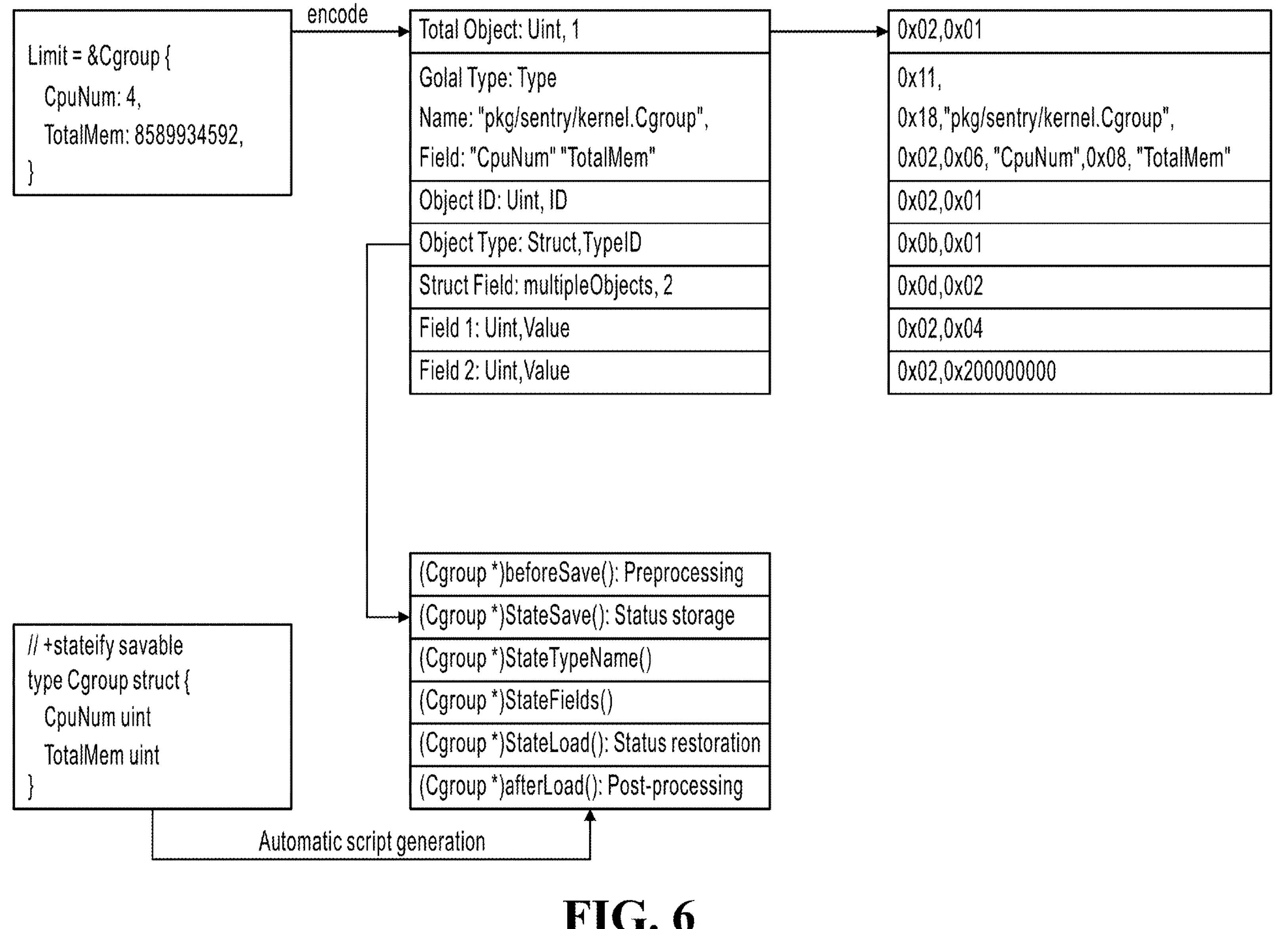
FIG. 6 is an example schematic diagram illustrating a process of generating a container snapshot for current container status data of a to-be-upgraded first container kernel, according to some embodiments of this specification.

FIG. 6 is an example schematic diagram illustrating a process of generating a container snapshot for current container status data (a partial data structure) of a to-be-upgraded first container kernel, according to some embodiments of this specification. The example shown in FIG. 6 is a process of generating a container snapshot for container status data "Cgroup struct" in the lower left corner. In the example of FIG. 6, the container status data "Cgroup struct" have two parameters: "CpuNum" and "TotalMem", whose values are "4" and "858993592", respectively.

At 550, a frozen application container is restarted by using a second container kernel used for upgrading a container kernel. The restarted container status data of the restarted application container include second container kernel status data corresponding to the second container kernel during restart of the application container, and the restarted container status data have a second data structure defined by a container kernel version of the second container kernel.

At 560, corresponding data fields in a data structure of the restarted container status data of the restarted application container are updated by using the stored current container status data. For a process of updating the container status data, references can be made to the above-mentioned descriptions of 240 in FIG. 2 and FIG. 4.

Figure 7:
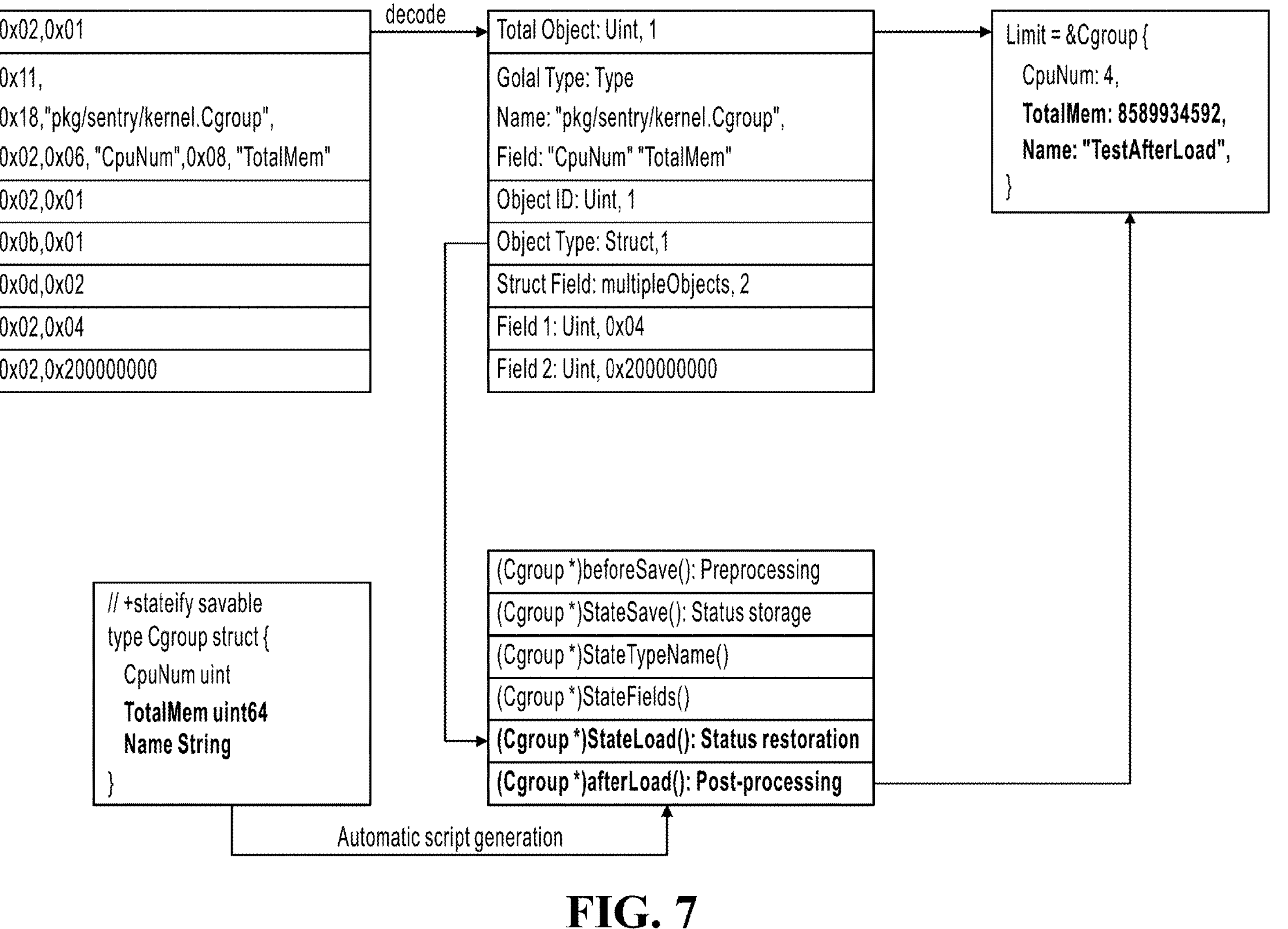
FIG. 7 is an example schematic diagram illustrating a container status data update process of a second container kernel used for upgrading a container kernel, according to some embodiments of this specification.

FIG. 7 is an example schematic diagram illustrating a container status data (partial data structure) update process of a second container kernel, according to some embodiments of this specification.

The example shown in FIG. 7 is a container status data update process for the example shown in FIG. 6. In the example of FIG. 7, the container status data "Cgroup struct" is modified to have three parameters: "CpuNum", "TotalMem", and "Name", and the updated values are "4", "858993592", and a new data field "TestAfterLoad".

At 570, post-processing is performed on the restarted application container.

In some embodiments, when post-processing is performed, a host file that is set to open in the stored current container status data can be re-opened.

In some embodiments, when post-processing is performed, the system startup time of the application container can be determined. A time offset of the system startup time can be calculated based on a difference between a new real time r1 and the recorded real time r0, i.e., offset=r1−r0. Therefore, a continuous system startup time is restored. In some embodiments, a hardware transceiver function of the application container can be enabled.

In response to completion of updating the container status data and completion of post-processing, at 580, a container application in the frozen application container is run again in the restarted application container, thereby implementing the process of upgrading a programmable container kernel.

The container kernel upgrade method based on a programmable container kernel according to some embodiments of this specification has been described above with reference to FIG. 1 to FIG. 7.

Figure 8:
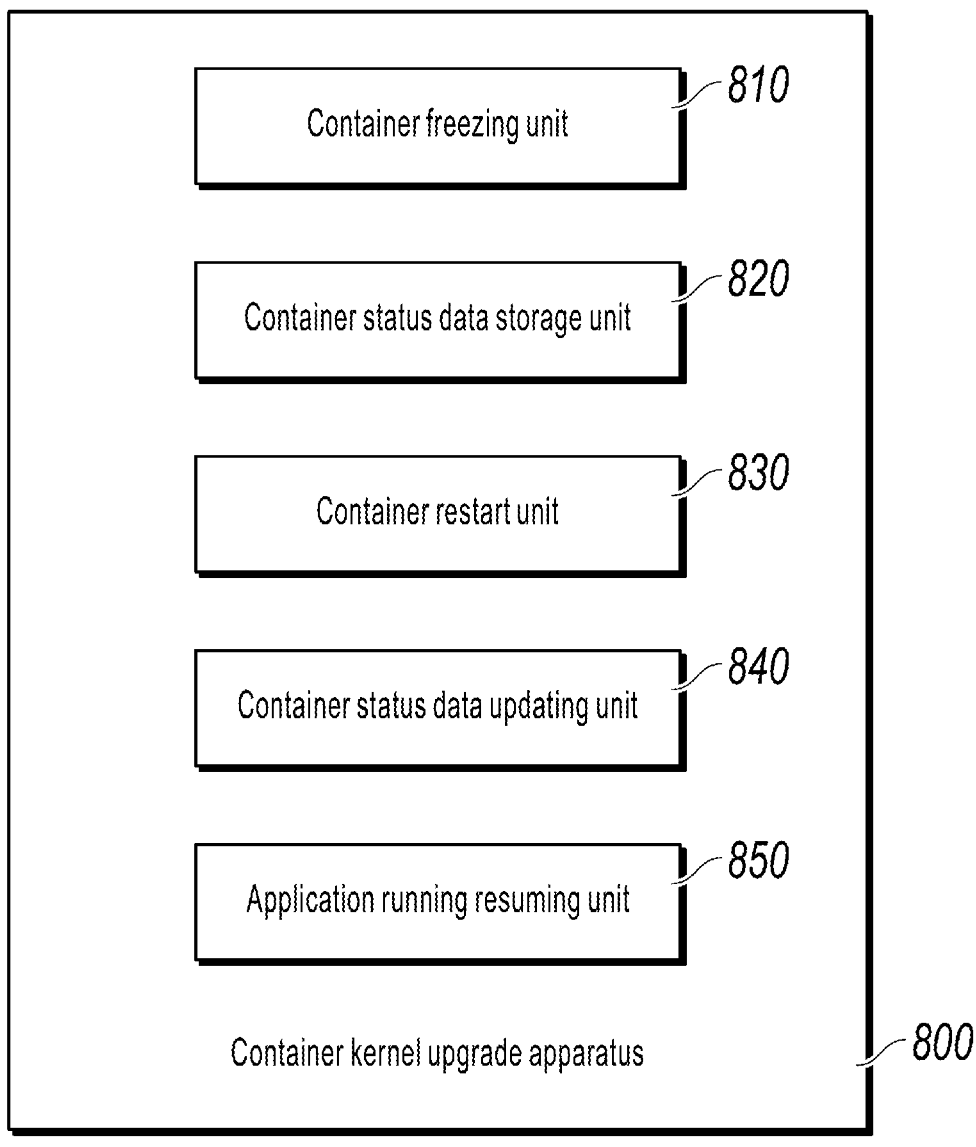
FIG. 8 is an example block diagram illustrating a container kernel upgrade apparatus based on a programmable container kernel, according to some embodiments of this specification.

FIG. 8 is an example block diagram illustrating a container kernel upgrade apparatus 800 based on a programmable container kernel, according to some embodiments of this specification. As shown in FIG. 8, the container kernel upgrade apparatus 800 includes a container freezing unit 810, a container status data storage unit 820, a container restart unit 830, a container status data updating unit 840, and an application running resuming unit 850.

The container freezing unit 810 is configured to: in response to receiving a container kernel upgrade request, freeze an application container in which a to-be-upgraded first container kernel is located. For an operation of the container freezing unit 810, references can be made to the operation described above with reference to 210 in FIG. 2.

The container status data storage unit 820 is configured to store current container kernel data of an application container, where the current container status data include container kernel status data corresponding to a first container kernel and all application status data of all applications running in the application container, and the current container status data have a first data structure defined by a container kernel version of the first container kernel. For an operation of the container status data storage unit 820, references can be made to the operation described above with reference to 220 in FIG. 2.

The container restart unit 830 is configured to restart the application container by using a second container kernel used for upgrading a container kernel. The restarted container status data of the restarted application container include second container kernel status data corresponding to the second container kernel during restart of the application container, and the restarted container status data have a second data structure defined by a container kernel version of the second container kernel. For an operation of the container restart unit 830, references can be made to the operation described above with reference to 230 in FIG. 2.

The container status data updating unit 840 is configured to update corresponding data fields in a data structure of the restarted container status data of the restarted application container by using the stored current container status data. For an operation of the container status data updating unit 840, references can be made to the operation described above with reference to 240 in FIG. 2.

The application running resuming unit 850 is configured to: in response to completion of updating the container status data, resume running of a container application in the frozen application container in the restarted application container. For an operation of the application restart unit 850, references can be made to the operation described above with reference to 250 in FIG. 2.

In some embodiments, the container status data storage unit 820 can store the current container status data in a data file in a form of a container snapshot, where the container snapshot is generated by performing data serialization on the current container status data. Correspondingly, the container status data updating unit 840 can include a container status data restoration module and a container status data updating module. The container status data restoration module is configured to perform data deserialization on the container snapshot in the data file to restore the current container status data. Then, the container status data updating module is configured to update the corresponding data fields in the data structure of the restarted container status data by using the restored current container status data.

In some embodiments, the current container status data and the restarted container status data are organized into a data tree. Correspondingly, the container status data updating module is configured to: perform the following update process on data nodes one by one from top to bottom starting from a root data node of the data tree of the restarted container status data: determining whether a current data node has a corresponding data node in the data tree of the current container status data; in response to that the data tree of the current container status data does not include the corresponding data node, skipping updating a data field part of the current data node; in response to that the data tree of the current container status data includes the corresponding data node, determining whether a data field of the current data node changes relative to the corresponding data node; in response to that the data field of the current data node does not change relative to the corresponding data node, directly updating data field information of the current data node by using data field information of the corresponding data node; and in response to that the data field of the current data node changes relative to the corresponding data node, updating the data field information of the current data node based on a specified policy by using the data field information of the corresponding data node.

Figure 9:
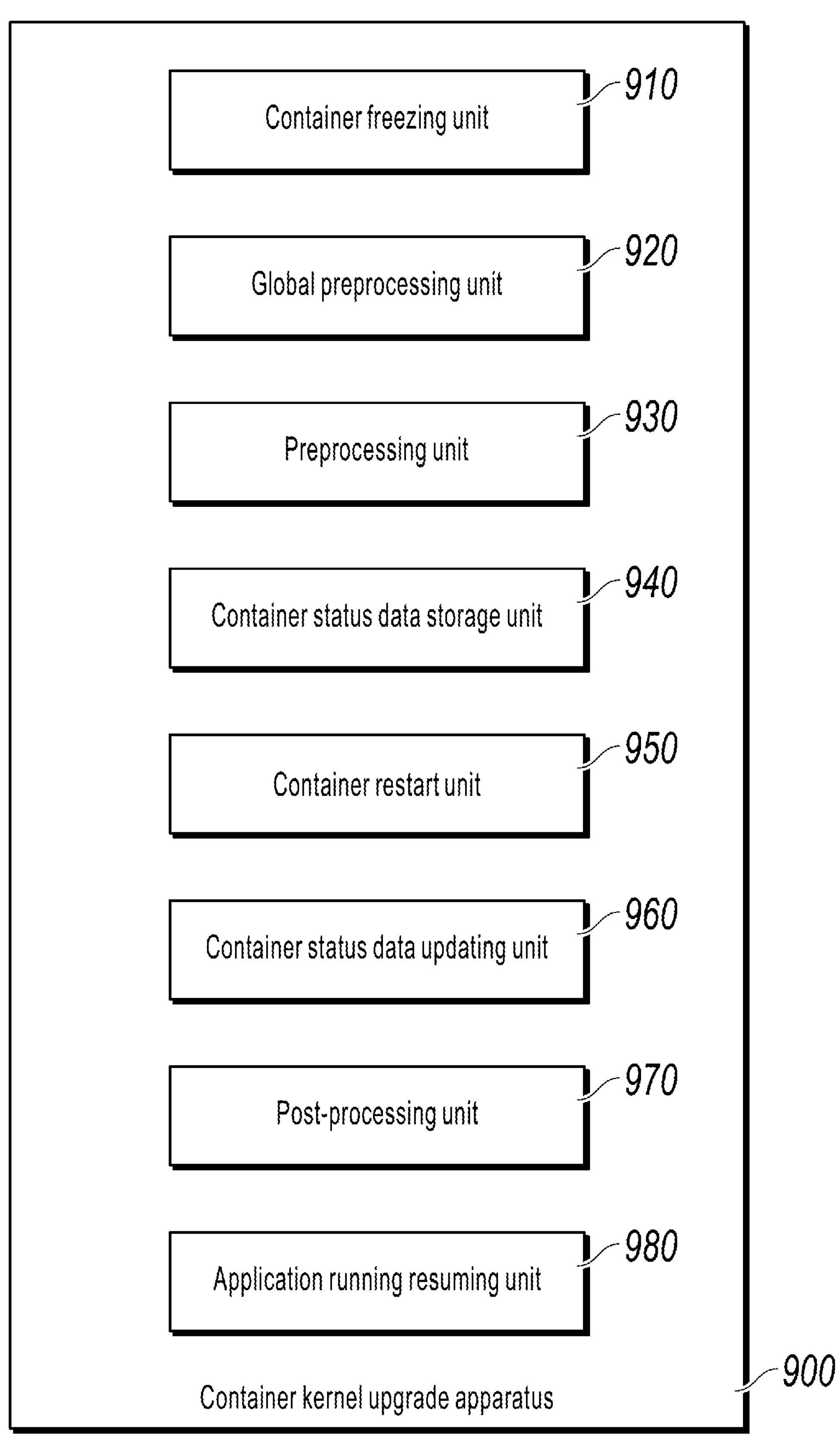
FIG. 9 is an example block diagram illustrating a container kernel upgrade apparatus based on a programmable container kernel, according to some other embodiments of this specification.

FIG. 9 is an example block diagram illustrating a container kernel upgrade apparatus 900 based on a programmable container kernel, according to some other embodiments of this specification. The embodiment shown in FIG. 9 is a modified embodiment for the embodiment shown in FIG. 8.

As shown in FIG. 9, the container kernel upgrade apparatus 900 includes a container freezing unit 910, a global preprocessing unit 920, a preprocessing unit 930, a container status data storage unit 940, a container restart unit 950, a container status data updating unit 960, a post-processing unit 970, and an application running resuming unit 980.

The container freezing unit 910 is configured to: in response to receiving a container kernel upgrade request, freeze an application container in which a to-be-upgraded first container kernel is located. For an operation of the container freezing unit 910, references can be made to the operation described above with reference to 510 in FIG. 5.

The global preprocessing unit 920 is configured to: before the storing current container status data of the application container, disable a packet receiving function of a driver cache of the application container, and submit a packet in the driver cache to the first container kernel.

In some embodiments, the global preprocessing unit 920 can be further configured to discard all cached data of the application container, for example, discard the cached data in the file cache to accelerate the process of status storage for the container kernel data.

The preprocessing unit 930 is configured to be capable of performing abnormality detection on container status data corresponding to each container component in the current container status data of the application container. Once a data abnormality is detected, the container kernel upgrade process is terminated. For an operation of the preprocessing unit 930, references can be made to the operation described above with reference to 530 in FIG. 5.

In some embodiments, the preprocessing unit 930 can be further configured to record a system startup time and a current real time of the application container. For example, the preprocessing unit 930 can record the system startup time m0 and the current real time r0 of the application container. As such, during data restoration, a time offset of the system startup time can be calculated based on a difference between a new real time r1 and the recorded real time r0, i.e., offset=r1−r0. Therefore, the restored system startup time is a continuous time.

The container status data storage unit 940 is configured to store current container status data of an application container, where the current container status data include container kernel status data corresponding to a first container kernel and all application status data of all applications running in the application container, and the current container status data have a first data structure defined by a container kernel version of the first container kernel. For an operation of the container status data storage unit 940, references can be made to the operation described above with reference to 540 in FIG. 5.

The container restart unit 950 is configured to restart the application container by using a second container kernel used for upgrading a container kernel. The restarted container status data of the restarted application container include second container kernel status data corresponding to the second container kernel during restart of the application container, and the restarted container status data have a second data structure defined by a container kernel version of the second container kernel. For an operation of the container restart unit 950, references can be made to the operation described above with reference to 550 in FIG. 5.

The container status data updating unit 960 is configured to update corresponding data fields in a data structure of the restarted container status data of the restarted application container by using the stored current container status data. For an operation of the container status data updating unit 960, references can be made to the operation described above with reference to 560 in FIG. 5.

The post-processing unit 970 is configured to: after completing the container status data update, re-open a host file that is set to open in the stored current container status data. For an operation of the post-processing unit 970, references can be made to the operation described above with reference to 570 in FIG. 5.

In some embodiments, the post-processing unit 970 can be configured to determine the system startup time of the application container. A time offset of the system startup time can be calculated based on a difference between a new real time r1 and the recorded real time r0, i.e., offset=r1−r0. Therefore, a continuous system startup time is restored. In some embodiments, a hardware transceiver function of the application container can be enabled.

The application running resuming unit 980 is configured to: in response to completion of updating the container kernel data and completion of the post-processing by the post-processing unit 970, resume running of a container application in the frozen application container in the restarted application container. For an operation of the application restart unit 980, references can be made to the operation described above with reference to 580 in FIG. 5.

It is worthwhile to note that in some other embodiments of this specification, some components in the embodiment shown in FIG. 9 can be modified or deleted.

The method for upgrading a container kernel of an application container and the container kernel upgrade apparatus according to some embodiments of this specification have been described above with reference to FIG. 1 to FIG. 9. The above-mentioned container kernel upgrade apparatus can be implemented by using hardware, or can be implemented by using software or a combination of hardware and software.

Figure 10:
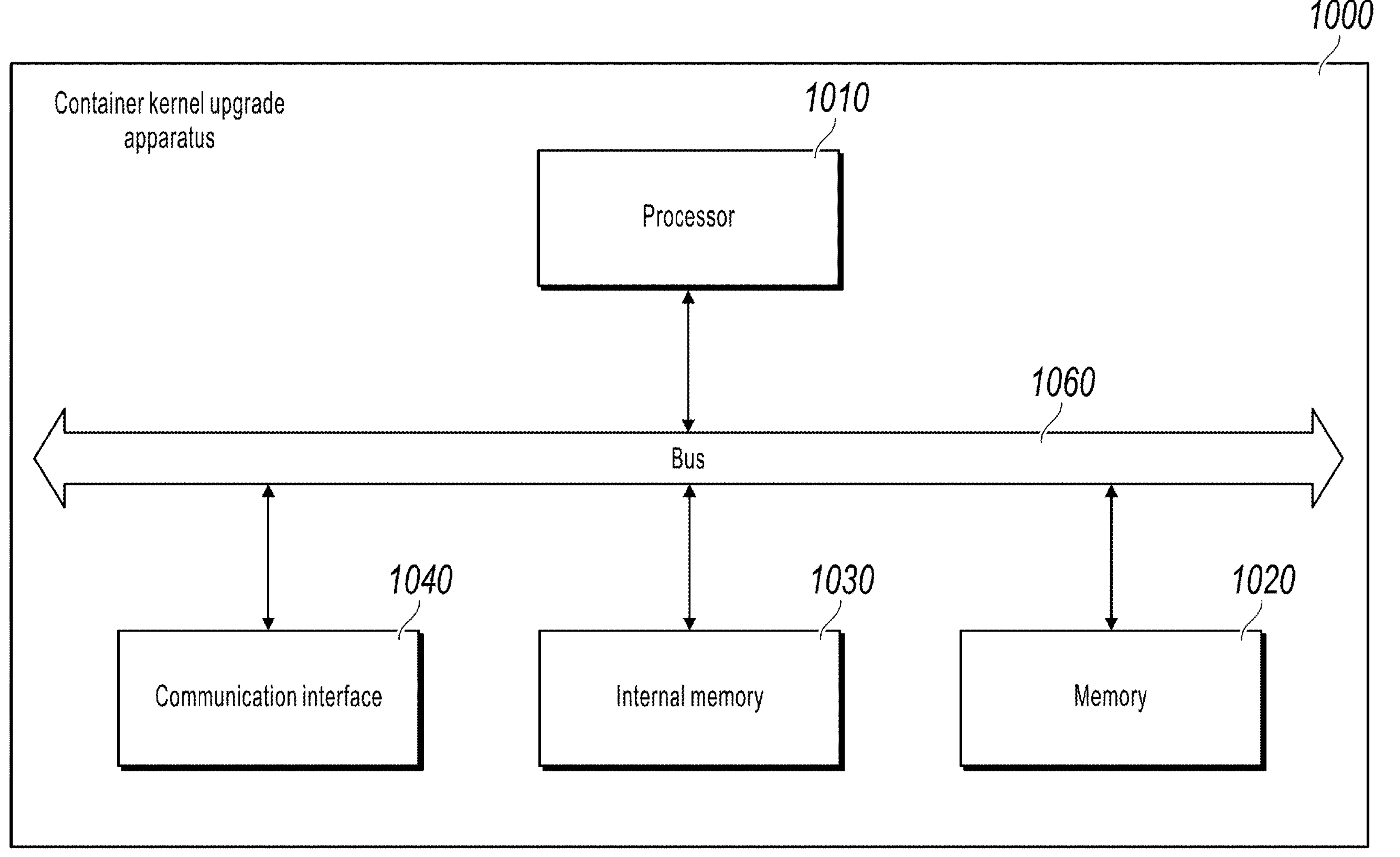
FIG. 10 is an example schematic diagram illustrating a container kernel upgrade apparatus implemented based on a computer system, according to some embodiments of this specification.

FIG. 10 is an example schematic diagram illustrating a container kernel upgrade apparatus 1000 implemented based on a computer system, according to some embodiments of this specification. As shown in FIG. 9, the container kernel upgrade apparatus 1000 can include at least one processor 1010, a memory (for example, a non-volatile memory) 1020, an internal memory 1030, and a communication interface 1040, and the at least one processor 1010, the memory 1020, the internal memory 1030, and the communication interface 1040 are connected together through a bus 1060. The at least one processor 1010 executes at least one computer-readable instruction (namely, the above-mentioned elements implemented in a software form) stored or encoded in the memory.

In some embodiments, the memory stores a computer-executable instruction, and when being executed, the computer-executable instruction enables the at least one processor 1010 to perform the following operations: in response to receiving a container kernel upgrade request, freezing an application container in which a to-be-upgraded first container kernel is located; storing current container status data of the application container, where the current container status data include first container kernel status data corresponding to the first container kernel and application status data of all applications running in the application container, and the current container status data have a first data structure defined by a container kernel version of the first container kernel; restarting the application container by using a second container kernel used for upgrading a container kernel, where restarted container status data of the restarted application container include second container kernel status data corresponding to the second container kernel when the application container is restarted, and the restarted container status data have a second data structure defined by a container kernel version of the second container kernel; updating corresponding data fields in a data structure of the restarted container status data by using the stored current container status data; and in response to completion of updating the container status data, resuming running of a container application in the frozen application container in the restarted application container.

It should be understood that, when being executed, the computer-executable instruction stored in the memory enables the at least one processor 1010 to perform various operations and functions described above with reference to FIG. 1 to FIG. 9 in some embodiments of this specification.

According to some embodiments, a program product such as a machine-readable medium (for example, a non-transitory machine-readable medium) is provided. The machine-readable medium can have an instruction (namely, the above-mentioned elements implemented in a software form). When the instruction is executed by a machine, the machine is enabled to perform the above-mentioned operations and functions described with reference to FIG. 1 to FIG. 9 in some embodiments of this specification. Specifically, a system or an apparatus with a readable storage medium can be provided, the readable storage medium stores software program code for implementing the functions in any one of some embodiments described above, and a computer or a processor of the system or the apparatus is enabled to read and execute the instructions stored in the readable storage medium.

In such case, the program code read from the readable medium can implement the functions in any one of some embodiments described above, and therefore the machine-readable code and the readable storage medium storing the machine-readable code form a part of this application.

Some embodiments of the readable storage medium include a floppy disk, a hard disk, a magneto-optical disk, an optical disc (such as a CD-ROM, a CD-R, a CD-RW, a DVD-ROM, a DVD-RAM, a DVD-RW, and a DVD-RW), a magnetic tape, a non-volatile memory card, and a ROM. Alternatively, the program code can be downloaded from a server computer or a cloud by a communication network.

According to some embodiments, a computer program product is provided, where the computer program product includes a computer program, and when the computer program is executed by a processor, the processor is enabled to perform the operations and functions described above with reference to FIG. 1 to FIG. 9 in some embodiments of this specification.

A person skilled in the art should understand that various variations and modifications can be made to some embodiments disclosed above without departing from the essence of this application. Therefore, the protection scope of this application should be defined by the appended claims.

It is worthwhile to note that, not all the steps and units in the above-mentioned processes and system structure diagrams are necessary, and some steps or units can be ignored based on an actual need. An order of performing the steps is not fixed, and can be determined based on a need. The apparatus structure described in some embodiments can be a physical structure or a logical structure. In other words, some units may be implemented by the same physical entity, or some units may be implemented by a plurality of physical entities, or may be implemented together by some components in a plurality of independent devices.

In some above-mentioned embodiments, a hardware unit or module can be implemented mechanically or electrically. For example, a hardware unit, a module, or a processor can include a permanent dedicated circuit or logic (such as a dedicated processor, FPGA, or ASIC) to complete a corresponding operation. The hardware unit or the processor can further include a programmable logic or circuit (such as a general-purpose processor or another programmable processor), and can be set temporarily by software to complete a corresponding operation. Some specific implementations (mechanical methods, dedicated permanent circuits, or temporarily disposed circuits) can be determined based on cost and time considerations.

The specific implementations illustrated above with reference to the accompanying drawings describe some example embodiments, but do not represent all embodiments that can be implemented or fall within the protection scope of the claims. The term "example" used throughout this specification means "used as an example, an instance, or an illustration", but does not mean "preferred" or "advantageous" over other embodiments. Specific implementations include specific details for the purpose of providing an understanding of the described technologies. However, these technologies can be implemented without these specific details. In some instances, to avoid obscuring the described concepts in the embodiments, well-known structures and apparatuses are shown in the form of a block diagram.

The above-mentioned descriptions of this application are provided to enable any person of ordinary skill in the art to implement or use this application. Various modifications made to this application are clear to a person of ordinary skill in the art, and the general principles defined in this specification can also be applied to other variants without departing from the protection scope of this application. Therefore, this application is not limited to the examples and designs described in this specification, but corresponds to the widest scope of principles and novel features disclosed in this specification.

What is claimed is:

1. A computer-implemented method for container kernel upgrade based on a programmable container kernel, comprising:

in response to receiving a container kernel upgrade request, freezing, as a frozen application container, an application container in which a to-be-upgraded first container kernel is located;

storing, as stored current container status data, current container status data of the application container, wherein the current container status data comprises first container kernel status data corresponding to a first container kernel and application status data of all applications running in the application container, and have a first data structure defined by the first container kernel, and wherein storing current container status data of the application container comprises storing the current container status data in a data file in a form of a container snapshot, wherein the container snapshot is generated by performing data serialization on the current container status data;

restarting, as a restarted application container, the application container by using a second container kernel used for upgrading a container kernel, wherein restarted container status data of the restarted application container comprises second container kernel status data corresponding to the second container kernel when the application container is restarted and has a second data structure defined by the second container kernel;

updating, using the stored current container status data, a corresponding data field in a data structure of the restarted container status data, wherein the stored current container status data and the restarted container status data are organized into a data tree, and comprising:

performing data deserialization on the container snapshot in the data file to restore, as restored current container status data, the stored current container status data; and updating, using the restored current container status data, the corresponding data field in the data structure of the restarted container status data, wherein the update is performed on data nodes one by one from top to bottom and starting from a root data node of the data tree of the restarted container status data; and in response to completion of updating the restarted container status data, resuming running of a container application in the frozen application container in the restarted application container.

2. The computer-implemented method of claim 1, wherein:

updating, by using the restored current container status data, the corresponding data field in the data structure of the restarted container status data, comprises:

performing, on data nodes one by one from top to bottom and starting from a root data node of the data tree of the restarted container status data, comprises:

determining whether a current data node has a corresponding data node in the data tree of the current container status data;

in response to that the data tree of the current container status data does not comprise the corresponding data node, skipping updating a data field part of the current data node;

in response to that the data tree of the current container status data comprises the corresponding data node, determining whether a data field of the current data node changes relative to the corresponding data node;

in response to that the data field of the current data node does not change relative to the corresponding data node, directly updating data field information of the current data node by using data field information of the corresponding data node; and in response to that the data field of the current data node changes relative to the corresponding data node, updating the data field information of the current data node based on a specified policy by using the data field information of the corresponding data node.

3. The computer-implemented method of claim 1, wherein the data file comprises a memory file or a disk file.

4. The computer-implemented method of claim 1, wherein, before storing, as stored current container status data, current container status data of the application container:

disabling a packet receiving function of a driver cache of the application container; and submitting a packet in the driver cache to the first container kernel.

5. The computer-implemented method of claim 4, wherein, before storing, as stored current container status data, current container status data of the application container:

discarding all cached data of the application container.

6. The computer-implemented method of claim 1, wherein, before storing current container status data of the application container:

performing abnormality detection on container status data corresponding to each container component in the current container status data of the application container; or recording a system startup time and a current real time of the application container.

7. The computer-implemented method of claim 1, wherein, after updating, using the stored current container status data, the restarted container status data:

re-opening a host file that is set to open in the current container status data.

8. The computer-implemented method of claim 7, wherein, after updating, using the stored current container status data, the restarted container status data:

determining a system startup time of the application container; or enabling a hardware transceiver function of the application container.

9. A non-transitory, computer-readable medium storing one or more instructions executable by a computer system to perform one or more operations for container kernel upgrade based on a programmable container kernel, comprising:

in response to receiving a container kernel upgrade request, freezing, as a frozen application container, an application container in which a to-be-upgraded first container kernel is located;

storing, as stored current container status data, current container status data of the application container, wherein the current container status data comprises first container kernel status data corresponding to a first container kernel and application status data of all applications running in the application container, and have a first data structure defined by the first container kernel, and wherein storing current container status data of the application container comprises storing the current container status data in a data file in a form of a container snapshot, wherein the container snapshot is generated by performing data serialization on the current container status data;

restarting, as a restarted application container, the application container by using a second container kernel used for upgrading a container kernel, wherein restarted container status data of the restarted application container comprises second container kernel status data corresponding to the second container kernel when the application container is restarted and has a second data structure defined by the second container kernel;

updating, using the stored current container status data, a corresponding data field in a data structure of the restarted container status data, wherein the stored current container status data and the restarted container status data are organized into a data tree, and comprising:

performing data deserialization on the container snapshot in the data file to restore, as restored current container status data, the stored current container status data; and updating, using the restored current container status data, the corresponding data field in the data structure of the restarted container status data, wherein the update is performed on data nodes one by one from top to bottom and starting from a root data node of the data tree of the restarted container status data; and in response to completion of updating the restarted container status data, resuming running of a container application in the frozen application container in the restarted application container.

10. The non-transitory, computer-readable medium of claim 9, wherein:

updating, by using the restored current container status data, the corresponding data field in the data structure of the restarted container status data, comprises:

performing, on data nodes one by one from top to bottom and starting from a root data node of the data tree of the restarted container status data:

determining whether a current data node has a corresponding data node in the data tree of the current container status data;

in response to that the data tree of the current container status data does not comprise the corresponding data node, skipping updating a data field part of the current data node;

in response to that the data tree of the current container status data comprises the corresponding data node, determining whether a data field of the current data node changes relative to the corresponding data node;

in response to that the data field of the current data node does not change relative to the corresponding data node, directly updating data field information of the current data node by using data field information of the corresponding data node; and in response to that the data field of the current data node changes relative to the corresponding data node, updating the data field information of the current data node based on a specified policy by using the data field information of the corresponding data node.

11. The non-transitory, computer-readable medium of claim 9, wherein the data file comprises a memory file or a disk file.

12. The non-transitory, computer-readable medium of claim 10, wherein, before storing, as stored current container status data, current container status data of the application container:

disabling a packet receiving function of a driver cache of the application container; and submitting a packet in the driver cache to the first container kernel.

13. The non-transitory, computer-readable medium of claim 12, wherein, before storing, as stored current container status data, current container status data of the application container:

discarding all cached data of the application container.

14. The non-transitory, computer-readable medium of claim 9, wherein, before storing current container status data of the application container:

performing abnormality detection on container status data corresponding to each container component in the current container status data of the application container; or recording a system startup time and a current real time of the application container.

15. The non-transitory, computer-readable medium of claim 9, wherein, after updating, using the stored current container status data, the restarted container status data:

re-opening a host file that is set to open in the current container status data.

16. The non-transitory, computer-readable medium of claim 15, wherein, after updating, using the stored current container status data, the restarted container status data:

determining a system startup time of the application container; or enabling a hardware transceiver function of the application container.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for container kernel upgrade based on a programmable container kernel, comprising:

in response to receiving a container kernel upgrade request, freezing, as a frozen application container, an application container in which a to-be-upgraded first container kernel is located;

storing, as stored current container status data, current container status data of the application container, wherein the current container status data comprises first container kernel status data corresponding to a first container kernel and application status data of all applications running in the application container, and have a first data structure defined by the first container kernel, and wherein storing current container status data of the application container comprises storing the current container status data in a data file in a form of a container snapshot, wherein the container snapshot is generated by performing data serialization on the current container status data;

restarting, as a restarted application container, the application container by using a second container kernel used for upgrading a container kernel, wherein restarted container status data of the restarted application container comprises second container kernel status data corresponding to the second container kernel when the application container is restarted and has a second data structure defined by the second container kernel;

updating, using the stored current container status data, a corresponding data field in a data structure of the restarted container status data, wherein the stored current container status data and the restarted container status data are organized into a data tree, and comprising:

performing data deserialization on the container snapshot in the data file to restore, as restored current container status data, the stored current container status data; and updating, using the restored current container status data, the corresponding data field in the data structure of the restarted container status data, wherein the update is performed on data nodes one by one from top to bottom and starting from a root data node of the data tree of the restarted container status data; and in response to completion of updating the restarted container status data, resuming running of a container application in the frozen application container in the restarted application container.

* * * * *